(No Model.)

F. DALSTROM.
WIND WHEEL.

No. 512,164. Patented Jan. 2, 1894.

WITNESSES
Geo. E. Frech.
Roland A. Fitzgerald.

INVENTOR
F. Dalstrom
per
Lehmann Pattison Nesbit
Attys

THE NATIONAL LITHOGRAPHING COMPANY,
WASHINGTON, D. C.

United States Patent Office.

FRED DALSTROM, OF AURORA, NEBRASKA.

WIND-WHEEL.

SPECIFICATION forming part of Letters Patent No. 512,164, dated January 2, 1894.

Application filed February 11, 1893. Serial No. 461,963. (No model.)

*To all whom it may concern:*

Be it known that I, FRED DALSTROM, of Aurora, in the county of Hamilton and State of Nebraska, have invented certain new and useful Improvements in Wind-Wheels; and I do hereby declare the following to be a full, clear, and exact description of the invention, such as will enable others skilled in the art to which it pertains to make and use it, reference being had to the accompanying drawings, which form part of this specification.

My invention relates to improvements in wind wheels; and it consists in the construction and combination of parts which will be fully described hereinafter and particularly pointed out in the claims.

The primary object of my invention is to provide a means for throwing the sails in and out of the wind by the movement of the wheel endwise upon its shaft through a suitable operating mechanism.

Another object of my invention is to provide a governor for the wheel, whereby its endwise movement is regulated automatically, and thus the wheel made to exert the same power and run with the same speed to which it is set, no matter what may be the variation in the force of the wind, and thus the speed or power of the wheel not affected by blasts or flaws of wind, which would otherwise increase and decrease the speed and power of the wheel as will be readily understood.

Figure 1:
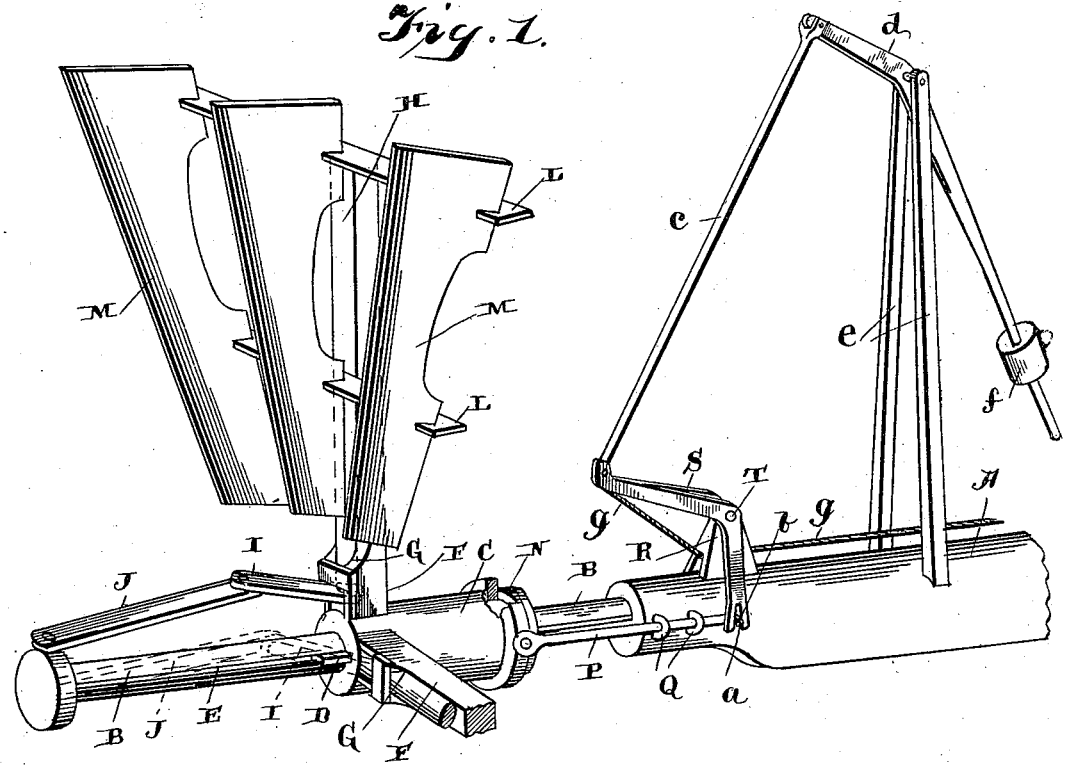
Figure 2:
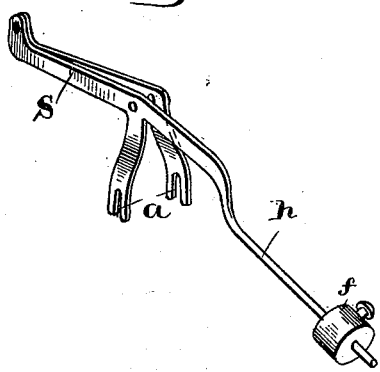

Figure 1, is a perspective view of my invention. Fig. 2, is a detached perspective view of a modification of the operating lever S.

A indicates an arm which has its inner end attached to the turn-table of a tower of any suitable design, and projecting outward therefrom a suitable distance to prevent the interference of the sails therewith when they are turned out of the wind. The outer end of this arm A is provided with a shaft B, upon which the hub C of the wheel slides endwise, the said hub being provided with a feather D, sliding in a longitudinal groove E, of the shaft, whereby the shaft is revolved with the wheel, while at the same time the wheel hub is allowed a free longitudinal movement thereon.

Secured at their inner ends to the hub are a series of radially extending arms F, which are provided at their ends with vertical bearings G, and in these bearings shafts H are journaled to rotate. Attached to the lower or inner ends of these shafts is a crank or arm I, to the outer end of which arm or crank is pivotally connected a link J, the opposite end of the link being pivotally connected to the outer end of the shaft. Owing to this construction it will be seen that when the hub is moved endwise the shafts journaled to the radial arms are rotated through the medium of the crank and link.

I preferably though not necessarily extend the shafts H beyond the outer ends of the arms F. To these shafts are attached cross pieces L, and to these cross pieces L the sails M are attached at a right angle as shown. Thus it will be seen that the rotation of the shafts H by the endwise movement of the hub effects the angle the sails present to the wind, and they will be turned out of the wind when the hub reaches one limit of its movement so that the shaft will not be turned, and will be thrown into the wind to the best advantage when the hub is at the other limit of its movement.

The endwise movement of the hub is effected in the following manner:—Placed around the hub in any suitable and convenient manner is a band or collar N, which allows the hub a free rotatory motion, but which engages the hub to prevent endwise movement independent of the collar. Connected to the opposite sides of the collar are the rods P, the opposite ends of the rods being supported in loops or guideways Q upon the arm A. Extending upward from the arm A is a short projection R. A lever S has its lower end bifurcated and straddled over this projection and pivoted thereto by a pin T. The ends of the bifurcations are provided with vertical slots $a$, into which projections $b$ of the rods $p$ extend. To the upper and outer ends of the lever is attached a rod, wire or chain $c$, the opposite end of the rod $c$ being connected to the short end of a lever $d$. This lever is supported by means of arms $e$, the opposite end of the lever carrying an adjustable weight $f$. By means of this construction, when a heavy blast of wind strikes the wheel, the hub is moved inward, and through the medium thereof as before described, the sails are partially turned, which reduces the surface presented to the wind and thereby the power and speed of the wheel maintained about the same.

For the purpose of turning the sails entirely out of the wind when desired, a chain $g$, is connected to the lever and extends downward to a convenient place to be operated.

Instead of the additional lever $d$, for the weight, an inwardly extending arm $h$ may be attached directly to the lever S, and carry the weight, the same effect being produced, as shown in Fig. 2.

Having thus described my invention, what I claim, and desire to secure by Letters Patent, is—

1. A wind wheel comprising a rotating shaft, an endwise moving hub upon said shaft and feathered thereto, independent sail supporting standards extending from and directly held by the hub, the standards having bearings at their outer sides, oscillating shafts journaled in the said standard bearings, sails carried by the shafts which extend from the lower ends of said standards and stop substantially at their upper ends, cranks rigidly connected to the lower ends of said oscillating shafts, and links connecting the ends of said cranks and the outer end of the rotating shaft, and a means for moving the hub endwise, substantially as shown and described.

2. A wind wheel comprising a rotating shaft, an endwise moving hub upon said shaft and feathered thereto, independent sail supporting standards supported at their inner ends directly by said hub, oscillating shafts of the same length as the standards and journaled thereto, sails carried by said shafts between their ends, and a crank and link connection between the lower ends of said oscillating shaft and the outer end of the rotating shaft, substantially as specified.

In testimony whereof I affix my signature in presence of two witnesses.

FRED DALSTROM.

Witnesses:
W. H. DODD,
W. W. SHEUBEYN.